US006821007B1

(12) United States Patent
Olman et al.

(10) Patent No.: US 6,821,007 B1
(45) Date of Patent: Nov. 23, 2004

(54) SHALLOW DEPTH BACK LIT ILLUMINATED SIGNAGE

(75) Inventors: Cheryl A. Olman, Minneapolis, MN (US); Kristin M. Schroeder, Roseville, MN (US); Robert H. Lowe, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 10/030,311

(22) PCT Filed: Apr. 25, 2000

(86) PCT No.: PCT/US00/11150

§ 371 (c)(1),
(2), (4) Date: Jun. 3, 2002

(87) PCT Pub. No.: WO00/65277

PCT Pub. Date: Nov. 2, 2000

(30) Foreign Application Priority Data

Apr. 28, 1999 (US) .................................. PCT/US99/09215

(51) Int. Cl.[7] ................................................ F21V 9/00
(52) U.S. Cl. .................... 362/511; 362/581; 296/180.4; 40/615
(58) Field of Search ................................ 362/511, 581, 362/559, 812; 296/180.4; 40/615

(56) References Cited

U.S. PATENT DOCUMENTS

| 4,536,251 A | | 8/1985 | Chiang et al. |
| 4,557,517 A | * | 12/1985 | Bolduc et al. ............. 362/485 |
| 4,726,989 A | | 2/1988 | Mrozinski |
| 4,867,881 A | | 9/1989 | Kinzer |
| 5,246,261 A | * | 9/1993 | McCormack ............. 296/24.1 |
| 5,432,876 A | | 7/1995 | Appledorn et al. |
| 5,596,450 A | | 1/1997 | Hannon et al. |
| 5,660,427 A | * | 8/1997 | Freeman et al. ....... 296/190.08 |
| 5,672,409 A | | 9/1997 | Miyakawa et al. |
| 6,024,476 A | * | 2/2000 | Wakeman ................ 362/581 |
| 6,598,328 B2 | * | 7/2003 | Aeling et al. ................ 40/615 |

FOREIGN PATENT DOCUMENTS

| EP | 0 724 181 A2 | 7/1996 |
| EP | 0 800 036 A1 | 8/1997 |
| FR | 2 727 498 | 2/1994 |
| FR | 2 706 018 | 12/1994 |
| WO | WO 97/26573 | 7/1997 |
| WO | WO 99/22174 A | 6/1999 |

* cited by examiner

Primary Examiner—Stephen Husar
Assistant Examiner—James W Cranson
(74) Attorney, Agent, or Firm—Stephen W. Buckingham (57) ABSTRACT

A compact, and low maintenance back lit illuminated sign (10), especially such a back lit sign suitable for use on a vehicle. The shallow back lit illuminated sign (10) comprises a housing (12), a light source (30) suitable for supplying light to a light fiber (20), and at least one side-light emitting fiber (20). The housing (12) has a sign face (14) and an interior surface (16, 18) that includes a back surface (19). The sign face (14) has an illuminated area that diffusely transmits light. The back surface (19) is located at a depth from the sign face (14). One or more side-light emitting fibers (20) are connected so as to receive light from the light source (30) and are mounted within the housing (12) so as to limit the amount of emitted light, from the fiber(s) (20), that travels directly to the sign face (14).

4 Claims, 3 Drawing Sheets

SHALLOW DEPTH BACK LIT ILLUMINATED SIGNAGE

FIELD OF INVENTION

This invention is directed in general to back lit signs that are illuminated using light fiber(s) and that exhibit diffuse reflection of light from the light fiber(s). More particularly, the invention is directed to such a lighted sign that is compact in the thickness dimension (i.e., has a shallow depth) and requires little maintenance. Even more particularly, the invention is directed to such a lighted sign that is suitable for use on a vehicle (e.g., an automobile). The invention is also directed to methods for making and using these signs.

BACKGROUND OF INVENTION

Lighted signs are everywhere in modern countries. The sign can educate, entertain, inform, or warn the viewer. The sign can be designed for close or distant viewing. Lighting is provided to assure the viewer can see the message, particularly during dimly lit days or nighttime. Lights require energy to power them. Modern countries readily can provide the power, but those who pay for the energy are always seeking more efficient delivery of the power and more efficient usage of the power. The energy required to power a lighted sign should not be wasted, for economic and environmental reasons. Lighted signs can be "front lit" or "back lit". The former typically include such signs as billboards or other displays where the light is shone from the perimeter of the sign at an angle toward the sign. The latter typically have a translucent surface through which the light is seen and on which the message or image is placed. Uniformity of light emanating from the translucent surface is important. Often, the translucent surface includes some element that diffuses the light to reduce the identification by the viewer of the point or linear source of the light within the sign housing. Typical back lit sign faces today are between 20% to 40% transmissive, emphasizing the importance of highly reflective sign cavities. White paint has been used to make the inside cavity surfaces of such signs reflective.

Lighted signs have been made in many configurations with a variety of light sources. Lighted signs have been integral to or mounted as a fixture on a building or vehicle, freestanding, or a part of other apparatus or equipment. Whenever the sign is lighted, the power used should not be wasted. Lighted signs have bad many geometric configurations. Lighted signs that have a perimeter shape of a complex geometry to convey the intended message are entirely different types of signs from lighted signs that rely on a Euclidean geometry with the intended message within the perimeter. In the industry, an example of the former type of sign is called "channel letters" and can generically be called "complex shape lighted signs." The latter are called "sign cabinets" because the perimeter of the sign is irrelevant to the message being conveyed. Nonlimiting examples of sign cabinets include rectangular, oval, circular, elliptical, and other Euclidean geometrical shapes. Nonlimiting examples of complex shape lighted signs include letters, profiles, silhouettes, characters, or any other shape desired by a customer that helps to advertise, educate, warn or the like.

In one particular application, sign cabinet type illuminated signs, back lit with fluorescent lighting, have been mounted on tractor trailer trucks in the front of the truck cab, above the windshield or windscreen. Such signs typically have a depth of 30 cm (12 in.) or more, with widths of about 2 m (6.5 ft.) and heights of about 50 cm (20 in.). Interior cabin space within the cab of such trucks, as with most vehicles, is limited. Therefore, it is desirable to utilize this space in the most efficient manner possible. However, because of their depth (e.g., 30 cm or more), too much valuable interior cabin space has had to be used to accommodate such illuminated signs. Another problem with such prior truck signs is associated with maintaining them. The cabinet portion of these truck signs has typically been made integral with the cab body of the truck. In addition, in order to protect the florescent bulbs and ballast inside the back lit truck sign from the weather, the face of the sign is typically sealed in place, for example, with a rubber ring gasket. As a result, the replacement of burned-out bulbs or worn-out ballast is a time consuming and costly procedure.

Therefore, there is a need for a more compact, particularly in the thickness dimension (i.e., depth) and low maintenance illuminated sign using light fiber(s) and that exhibit diffuse reflection of light from the light fiber(s). More particularly, the invention is directed to such a lighted sign that is compact in the thickness dimension (i.e., has a shallow depth) and requires little maintenance. Even more particularly, the invention is directed to such a lighted sign that is suitable for use on a vehicle (e.g., an automobile).

SUMMARY OF INVENTION

What the art of lighted signs needs is a more compact, particularly in the thickness dimension (i.e., return depth), and low maintenance back lit illuminated sign, especially a back lit sign suitable for use on a vehicle (e.g., an automobile, bus, truck, train, airplane, watercraft and aircraft).

One aspect of the invention is a shallow back lit illuminated sign comprising a housing, a light source and at least one side-light emitting fiber. The housing has a sign face and an interior surface that includes a back surface. The sign face has an illuminated area (i.e., an area of the sign face that will be illuminated) through which light from inside the housing can be diffusely transmitted out of the housing. At least a portion, and preferably most, if not all, of the interior surface is diffuse reflective enough to provide luminance uniformity to the sign. Preferably, the interior surface is sufficiently diffuse reflective to also provide luminous efficiency (i.e., ratio of the amount of light transmitted out of the sign to the amount of light emitted from the fiber(s)) to the sign. The back surface is located at a depth from the sign face, and the sign has a large aspect ratio.

The light source is suitable for supplying light to a light fiber. It is desirable for the light source to be located outside of the housing, but not so far from the housing as to result in an objectionable loss in the efficiency of the fiber (i.e., requiring significantly more power to operate properly). One or more side-light emitting fibers are connected so as to receive light from the light source and are mounted within the housing so as to significantly limit the amount of emitted light, from the fiber(s), that travels directly to the sign face (i.e., that does not reflect at least once off of a diffuse reflective surface before traveling to the sign face). These fibers can be the rigid or flexible type.

The amount of emitted light that travels directly to the sign face is considered significantly limited when there are no visually apparent (with normal contrast sensitivity) and undesirable or offensive "hot spots" on the sign face. To help prevent such direct travel of the emitted light to the sign face, it is desirable for the side-light fiber(s) to be located on the interior surface of the housing, with the light being emitted from the fiber(s) at a narrow enough angular distribution (e.g., 5–20 degrees) that the emitted light travels in a direction generally parallel to the sign face, while allowing incidence on the back surface and other portions of the interior surface.

The diffuse reflective portion of the interior surface is, preferably, a film or sheet attached to the inside of the housing such as, for example, by an adhesive. It can also be desirable for the back surface to be diffuse reflective and have a concave curvature relative to the sign face. The sign is preferably a sign cabinet and can have a housing that is mountable on a vehicle.

A sign face that "diffusely transmits light" is one that scatters transmitted light and, preferably, is one that exhibits an appropriate balance between light transmission and reflection, with a low absorption of light, in order to provide the sign face with the brightness and degree of luminance uniformity desired.

A large "aspect ratio" is where the illuminated area of the sign face is large relative to the distance or depth between the sign face and the back surface. Typically, the depth is substantially smaller then the major dimensions of the housing.

"Film" means a thin, flexible sheet in existence prior to contact with the sign housing.

A "diffuse reflective" surface means a surface that is reflective without being a mirrored surface (i.e., a specular reflector). "Reflective" is an adjective of the noun "Reflectivity" which is expressed in an industrial standard established by the American Society for the Testing of Materials (ASTM) in Standard ASTM E1164-94.

"Luminance uniformity" means that the brightness of light emanating from a translucent surface is substantially uniform in a large number of locations on the surface, yielding a sign that does not significantly identify the location(s) of light source(s) within the sign housing.

"Hot spots" are areas on the sign face of noticeably higher brightness, typically the result of unreflected and undiffused light traveling directly to the sign face.

In another aspect of the invention, a vehicle is provided that comprise the above sign. The vehicle can be an automobile such as, for example, a truck. It can be desirable for the vehicle to be a truck that has a cab with an exterior surface and an interior cabin space, when the sign has a depth and is mounted in the cab such that the sign face is about flush with the exterior surface and the housing extends very little, if any, into the interior cabin space. The boundary of the interior cabin is typically defined, at least in part, by a headliner. It is desirable for the back of the housing not to extend beyond the headliner. Preferably, the housing is dimensioned to fit between the exterior of the truck cab and the headliner.

The inventive sign, for use in a vehicle, is energy efficient and does not require a power supply separate from the vehicle's conventional power generation system (e.g., the battery). The invention can also be made environmentally friendly. There are no disposal issues like those with fluorescent light systems, which can contain, e.g., heavy metals, like the mercury in some fluorescent lights.

In an additional aspect of the invention an unassembled shallow back lit illuminated sign is provided. The unassembled sign comprises a sign face panel and at least one interior surface panel which can be assembled to form a housing, a light source for supplying light to a light fiber, and at least one side-light emitting fiber. The sign face panel has an illuminated area that diffusely transmits light, and at least one interior surface panel which can be assembled to form a housing. The interior surface of the housing can be a shaped single panel or multiple panels which can be assembled. The sign can also be provided in a unitary (e.g., sealed) structure, as well as in multiple pieces. When assembled to form the housing, the interior surface panel(s) form an interior surface of the housing including a back surface, the interior surface has at least a portion thereof that is diffuse reflective enough to provide luminance uniformity to the assembled sign, the back surface is located at a depth from the sign face, and the illuminated area is large relative to the depth. The side-light emitting fiber is connectable so as to receive light from the light source and mountable within the assembled housing so as to significantly limit the amount of emitted light, from the fiber, that travels directly to the sign face.

The diffuse reflectivity of the interior surface can be provided by at least one diffuse reflective film either pre-attached to or separate from but attachable to the at least one interior surface panel. In addition, the at least one interior surface panel can be a plurality of interior surface panels and the diffuse reflectivity of the interior surface can be provided by a plurality of diffuse reflective films, with each film being either pre-attached to or separate from but attachable to at least one of the interior surface panels.

It can be desirable for a plurality of interior surface panels to be used, and the back surface to be formed by at least two interior surface panels.

In a further aspect of the invention, the unassembled sign is provided in the form of a packaged kit.

The diffuse reflective portion(s) of an interior surface of the housing captures the lumens of light from the light source or those lumens of light reflecting back from a diffusing panel or sides and backs of the housing (e.g., a light cabinet) and re-directs such light toward the viewer, thereby providing luminance uniformity on the translucent surface of the sign face.

It is desirable for the diffuse reflectivity of the overall interior surface to be at least 80%, preferably at least about 90%, more preferably at least about 92% and even more preferably at least about 94%, as measured using ASTM E1164-94 at a wavelength of 550 nm.

The reflectivity of the film can be controlled to provide desired power consumption reductions, as well as improved luminance uniformity, according to the needs of those skilled in the art of signage construction. An improvement in luminance uniformity can also provide significant power reduction for a sign. Thus, both the utility and aesthetics of a sign can be addressed by the invention.

DETAILED DESCRIPTION OF EMBODIMENTS OF THE INVENTION

Although the present invention is herein described in terms of specific embodiments, it will be readily apparent to those skilled in this art that various modifications, rearrangements, and substitutions can be made without departing from the spirit of the invention. The scope of the present invention is thus only limited by the claims appended hereto.

In what follows, a number of signs of the invention are described. Since these signs include identical or at least similar components, such components are not explained repeatedly herein and may be indicated by the same numerals.

Figure 1:
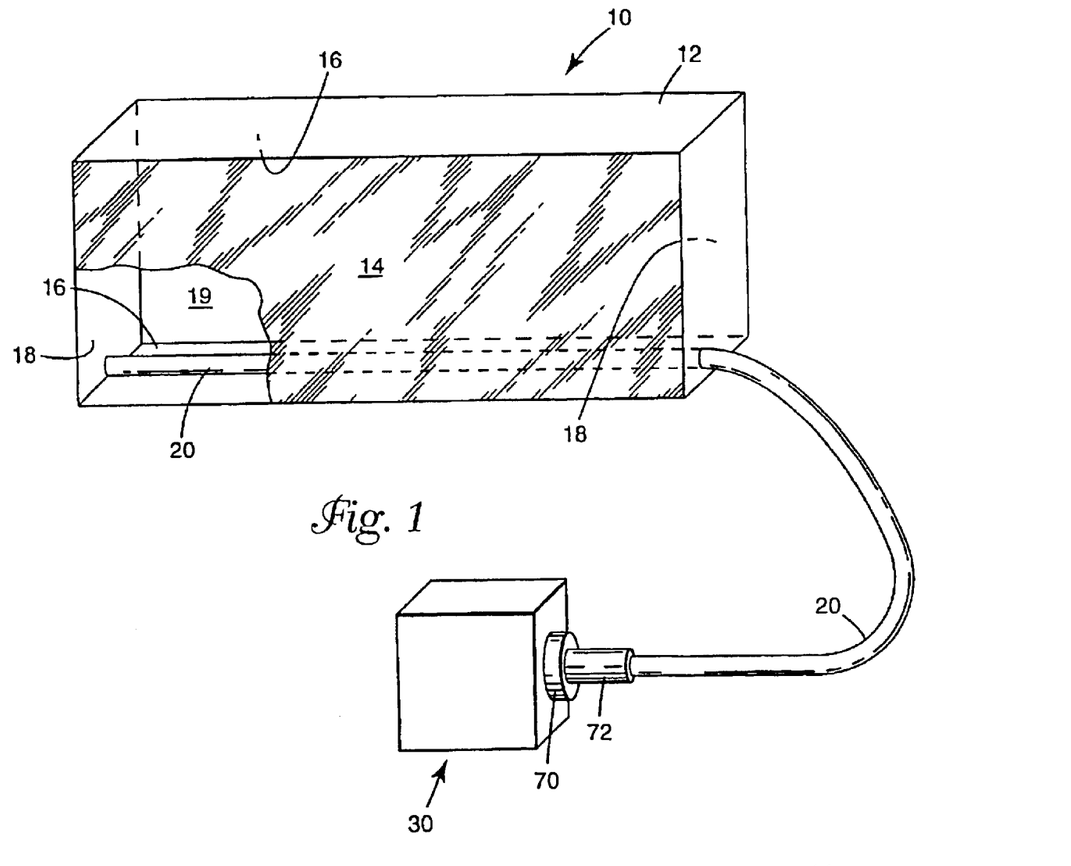
FIG. 1 is a partially broken-away perspective view of a sign of the invention.

Referring to FIG. 1, a shallow depth back lit illuminated sign 10 of the invention generally includes a housing 12 having a sign face 14 and one or more interior surfaces 16, 18 and 19. The sign face 14 has an illuminated area through which light from inside the housing 12 diffusely transmits out of the housing 12. For a cabinet type sign 10, an image will typically be on the sign face 14. With a rectangular shaped housing 12, the interior surface(s) can include top and bottom (e.g., horizontal) interior surfaces 16, two side (e.g., vertical) interior surfaces 18, and a back (e.g., vertical) interior surface 19. The illuminated area of the sign face 14 is large relative to the distance or depth between the sign face 14 and the back surface 19. In the illustrated sign 10, the depth between the sign face 14 and the back surface 19 is less than the distance or width between the side surfaces 18 and less than the distance or height between the top and bottom surfaces 16.

At least a portion of the interior of the housing 12 is diffuse reflective enough to provide a desired overall luminance efficiency and uniformity to the sign 10. The diffuse reflective portions of the interior surfaces 16, 18 and 19 are provided by diffuse reflective films or sheets attached (e.g., by a suitable adhesive, mechanical fastener, etc.) to the inside surfaces of housing panels that correspond to the surfaces 16, 18 and 19. Nonlimiting examples of mechanical fasteners include Scotchmate™ and Dual Lock™ fastening systems from Minnesota Mining and Manufacturing Company. These housing panels can be made of any of a variety of inexpensive and heat resistant materials such as, for example, aluminum, steel, plastic, wood, particle board, etc. It can be preferable for all areas of each of the interior surfaces 16, 18 and 19 to be diffuse reflective, because the more diffuse reflective area of the interior surfaces, the more efficient the use of lumens of light from the light fiber(s). That is, the amount of light lost to absorption is less. Such diffuse reflective films, sheets and other means are described in further detail below.

At least one side-light emitting fiber 20 is arranged within the interior of housing 12 so as to significantly limit the amount of fiber emitted light that travels directly to the sign face 14 and maximize the amount of fiber emitted light that reflects at least once off of a diffuse reflective surface (e.g., surfaces 16, 18 and/or 19) before traveling to the sign face 14. To help prevent such direct travel of the emitted light to the sign face 14, it is desirable for the side-light fiber(s) 20 to be located on an interior surface of the housing 12, with the light being emitted from the fiber(s) 20 at a narrow enough angular distribution that the emitted light travels in a direction generally parallel to the sign face 14, while allowing a first incidence on target surfaces (i.e., the back surface 19 and other interior surfaces). It can also be desirable for the fiber(s) 20 to be mounted along the bottom and/or top side 16 so that the emitted light has a shorter distance to travel before reflecting off of an interior surface, compared to the width of the housing 12. As the distance between the light fiber and the target surface is reduced, the angular distribution of the emitted light can increase. Exemplary side-light fibers are described in further detail below.

A light source 30 for supplying light to the fiber 20 is located outside of the housing 12, but not so far from the housing 12 as to result in an objectionable loss in the efficiency of the fiber. The free end of the fiber 20 is inserted into the light source 30. An exemplary light source 30 and its connection with the fiber 20 is described in greater detail below.

Figure 2:
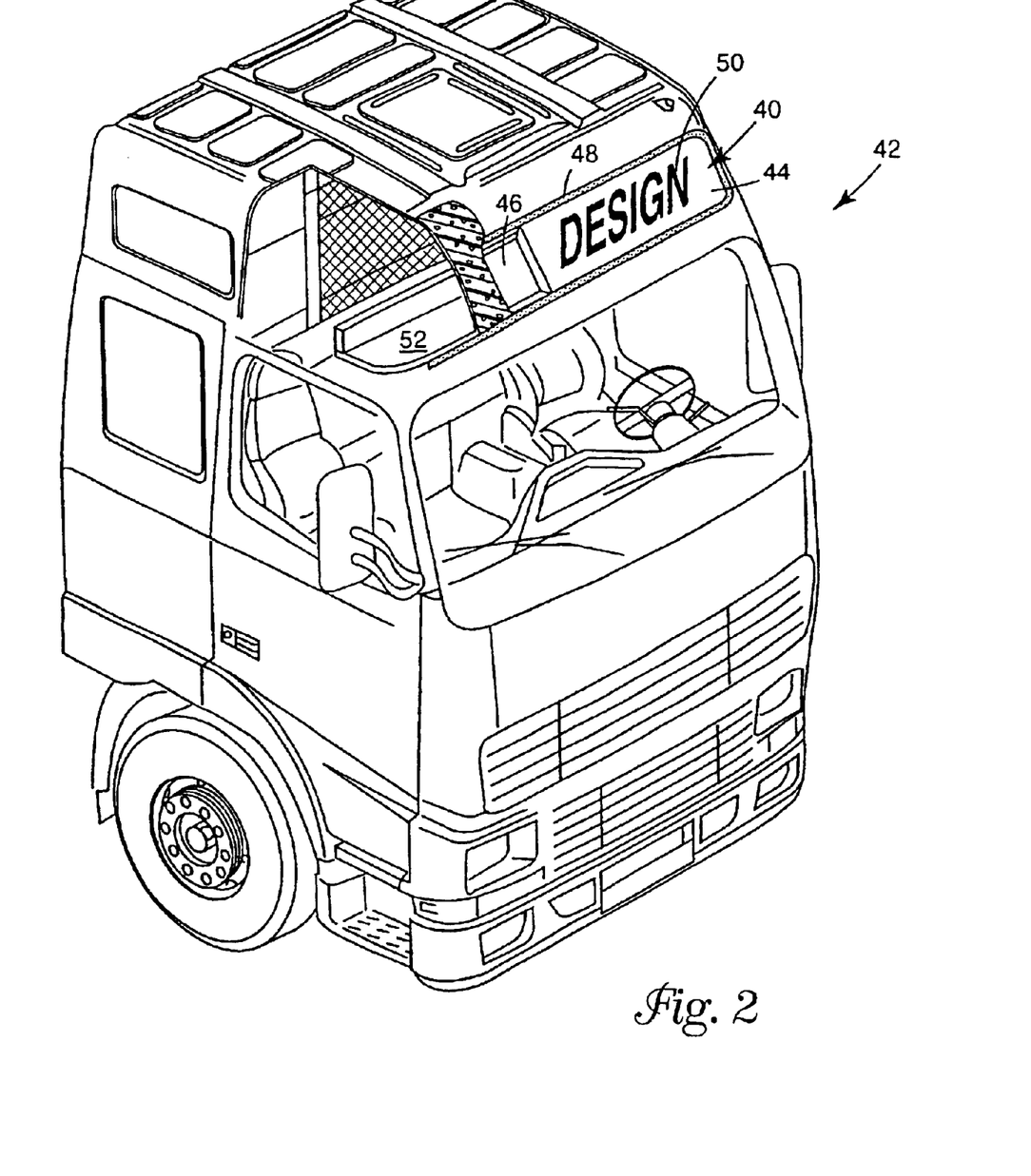
FIG. 2 is a partially broken-away perspective view of a heavy truck mounting a sign of the invention.
Figure 3:
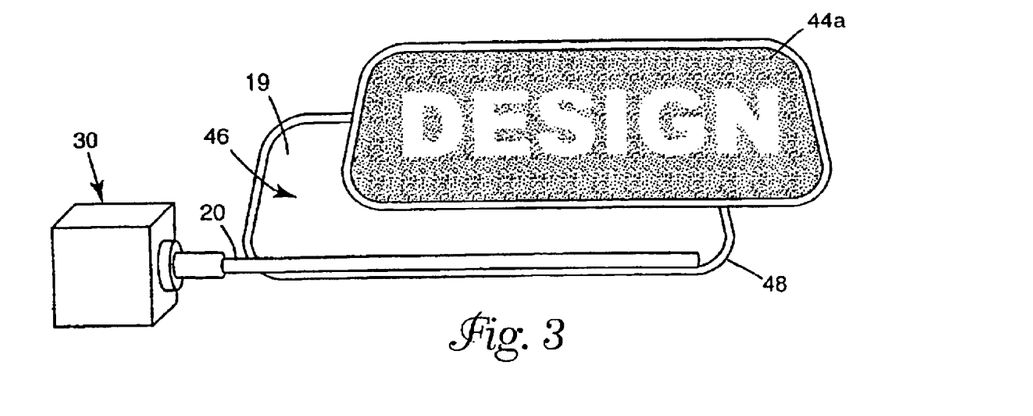
FIG. 3 is a plan view of another sign of the invention mountable in the heavy truck of FIG. 2.

Referring to FIG. 2, a specific cabinet type sign 40, of the invention, is mountable in the front of a truck cab 42, above the windshield or windscreen, of a heavy truck such as, for example a class 7 and class 8 heavy truck. The sign 40 includes a side-light fiber 20, a light source 30, and a housing 46 (see the discussion below on FIG. 4 for more detail) having a sign face 44 of, for example, a frosted automotive glass construction. The sign face 44 is sealed in place, for example, with a rubber ring gasket 48. The sign face 44 of FIG. 2 has an image 50 (e.g., lettering) that is designed to illuminate the background and not the image 50 itself. Optionally, an alternative sign face 44a can be used having an image that is designed to illuminate the image and not the background (see FIG. 3).

The housing 46 of the sign 40, for example, has a depth of about 55 mm (2 in.), with a width of about 2 m (6.5 ft.) and a height of about 50 cm (20 in.). Prior signs used for such trucks have depths of 30 cm (12 in.) or more. Because it is shallow, the sign 40 utilizes significantly less of the interior cabin space within the cab 42 of such trucks. As a result, the excess cabin space can be used, for example, to provide the truck driver with additional amenities like a storage shelf 52. This advantage of additional cabin space can be realized with other vehicles as well.

Figure 4:
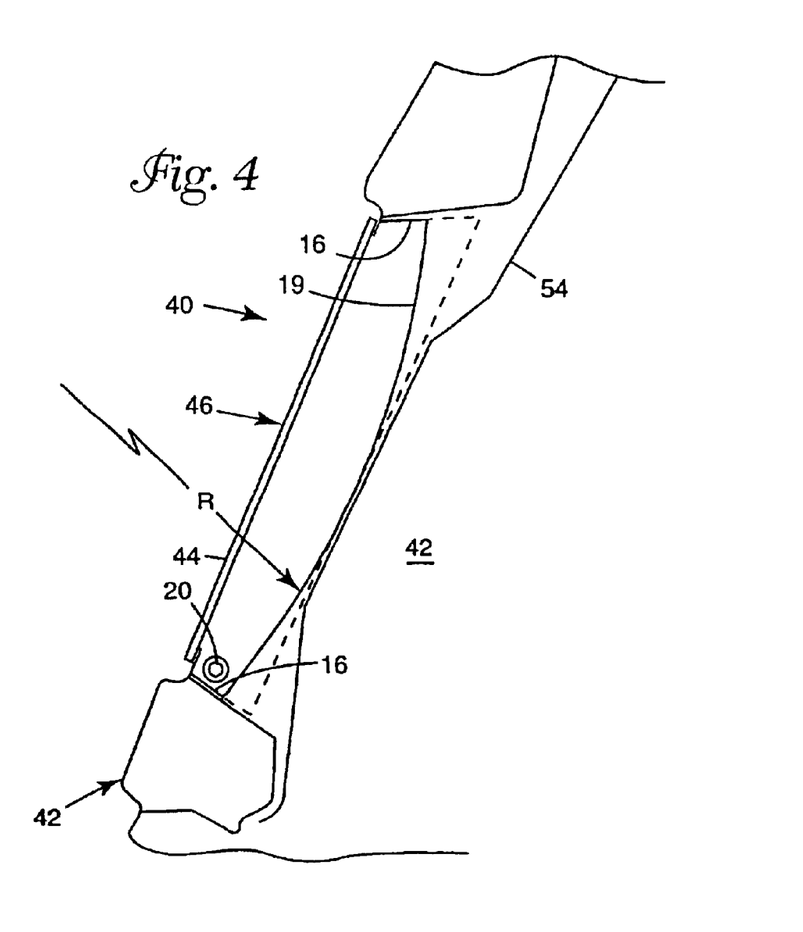
FIG. 4 is a cross-sectional view of the housing and light fiber of the sign mounted in the truck of FIG. 2.

Referring to FIG. 4, the housing 46 of the sign 40 has a back interior surface 19, top and bottom interior surfaces 16 and two side interior surfaces (not shown). It has been found desirable to provide the back surface 19 for the housing 46 with a radius of curvature R of about 75 cm (29.57 in.). The back surface 19 of the housing 46 can optionally be flat and parallel to the sign face 44 (shown in phantom). Because of its shallow depth (5.5 cm), the housing 46 can be mounted in the space between the exterior of the truck cab 42 and its headliner 54. In addition, because the sign 40 is illuminated by the light fiber 20 and the light source 30 is located outside the housing 46 (e.g., mounted on the shelf 52), the problems associated with maintaining the prior back lit truck signs can be avoided. There should be no need for access to the light fiber 20 inside the housing 46, and the light source 30 can be made readily accessible for routine maintenance and repair.

EXAMPLES

Side-Light Fibers

Many types of side-light fibers may be used in the articles of the invention. Particularly suitable light fibers are prepared from polymeric materials and are commercially available from one or more sources such as 3M Company (St. Paul, Minn.), Lumenyte International, Inc. (Costa Mesa, Calif.), Fiberstars, Inc. (Fremont, Calif.), Bridgestone Corp. (Tokyo, Japan), Rohm and Haas Co. (Philadelphia, Pa.), and Mitsubishi Rayon Co., Ltu (Tokyo, Japan).

Figure 5A:
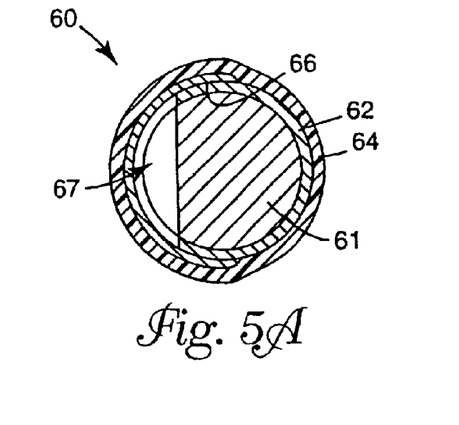
FIGS. 5A and 5B are cross-sectional views of two side-light fibers that may be used in a sign of the invention.
Figure 5B:
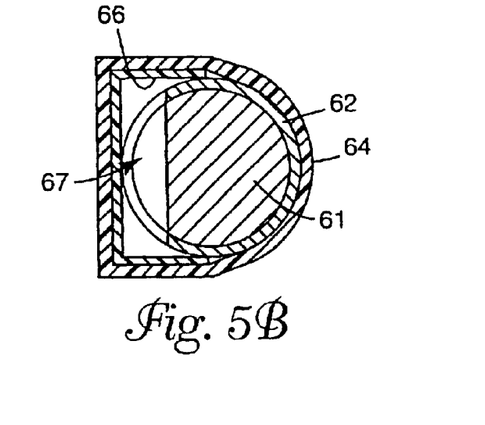

Referring to FIGS. 5A and 5B, a side-light fiber 60 can include a high index of refraction core 61 and a low index of refraction cladding 62, encased in a jacket 64 with a strip 66 of diffuse reflective sheet material disposed therebetween. FIG. 5A shows a circular design and FIG. 5B shows a square design. It will be understood that other shapes and configurations may be similarly used. "Side-light" may optionally be extracted from the light fiber 60 by either diffuse or directed light extractor structures in the light fiber 60. If directed light extraction is used, then preferably the stray light is directed toward the strip 66 of diffuse reflective sheet material. If the light fiber 60 uses notches 67 formed in the core 61 and cladding 62 (i.e. notched side extraction), such as that disclosed in U.S. Pat. No. 5,432,876 (Appeldorn et al), which is incorporated herein by reference in its entirety, the notches 67 face toward the diffuse reflective strip 66 and the extended light is directed away from the strip 66.

The greatest amount of light in the light fiber is available for extraction immediately adjacent to the light source. Diminishing amounts of light are available further down the core because light has already been extracted. Therefore, graded extraction is preferably carried out so that the least amount of light extraction takes place closest to the light source and the greatest amount takes place farthest away from the source. The notches are spaced so as to produce such a graded extraction.

Examples of side-light fibers that have produced acceptable results are:

(1) a 12 mm light fiber with a 1 mm wide white Scotchcal™ vinyl strip of sheet material from 3M Company, St. Paul Minn., catalog nos. 7725-20 and 3630-20.

(2) a 12 mm light fiber with notched side extraction from Lumenyte International, Inc., Costa Mesa, Calif.

Diffuse Reflective Film or Sheet

Diffuse reflection provides reflective luminance over a range of angles, regardless of the angle that the incident radiation makes with respect to the macroscopic surface of the diffuse reflective sheet material. It is this property of diffuse reflective film or sheet material that allows such material to be used to reflect even highly directed light and provide diffuse light over an illumination area.

A variety of diffuse reflective materials are known including, for example, white inorganic pigments in the form of a pressed cake, ceramic tile or opal glass. These materials may be expensive, stiff and brittle.

Diffuse reflective sheet materials include microvoided particle-filled sheets that are diffusely reflective due to differences in refractive index of the particles, the surrounding matrix, and air-filled voids created or enlarged by, for example, stretching. In addition, microporous materials made from, for example, sintered polytetrafluoroethylene (PTFE), made in sheet form, can also act as diffuse reflective material.

Preferred diffuse reflective sheet materials for use in the invention include any sheet material having a reflectivity of at least about 90%, preferably at least about 92%, and more preferably at least about 94%, as measured according to ASTM E 1164-94 at a wavelength of 550 nm. Specific sheet materials useful in the invention include, but are not limited to, sintered poly(tetrafluoroethylene) as described in U.S. Pat. No. 5,596,450; filled polyolefin reflective sheets such as those described in European Patent Application No. 724, 181; biaxially stretched white polyester laminated film such as is described in U.S. Pat. No. 5,672,409; Tyvek™ nonwoven polyethylene fabric (DuPont Co., Wilmington, Del.); Melinex™ titania-filled microvoided polyethylene terephthalate (ICI Plastics, Wilmington, Del.); ScotchCal™ vinyl sheet material (3M Company, St. Paul, Minn., e.g., catalog numbers 7725-20 and 3630-20); the white vinyl Film number VS8480 (3M Company, St. Paul, Minn.) having an average diffuse reflectivity of 94%–95%; other white films such as Gerber™ catalog numbers 220-20 and 230-20 (Gerber Scientific, Inc., South Windsor, Conn.); Poreflon™-brand polytetrafluoroethylene sheet material (Sumitomo Electric Industries, Osaka, Japan) paper-like synthetic poly(ethylene terephthalate) (PET) sheet materials; and similar microporous or filled sheet materials, so long as the sheet materials exhibit the required reflectivity.

Another particularly suitable diffuse reflective sheet material comprises a microporous polyolefin material such as described in U.S. Pat. Nos. 4,539,251, 4,726,989, and 4,867,881, incorporated herein by reference, which may be referred to as a TIPS sheet material. TIPS means "thermally induced phase separation." TIPS sheet material typically includes a thermoplastic polymeric structure having a plurality of cells with adjacent cells being interconnected by passageways to provide a network of communicating pores. This structure is oriented in at least one direction. The thermoplastic polymeric structure may be substantially homogeneous or the porosity of the structure may exhibit a gradient therethrough. The cells typically include void spaces encased by fibrous, lacy, or semi-continuous boundaries.

Microporous TIPS sheet materials can be prepared from known thermoplastic polymers including olefinic, condensation and oxidation polymers. Representative olefinic polymers include high- and low-density polyethylene, polypropylene, poly-vinyl polymers, butadiene-containing polymers, and acrylate containing polymers such as poly (methyl methacrylate). Condensation polymers include polyesters such as polyethylene terephthalate) (PET) and poly(butylene terephthalate) (PBT); polyamides such as Nylon™6, Nylon 11, Nylon 13, and Nylon 66; polycarbonates; and polysulfones. Poly(phenylene oxide) is representative of the oxidation polymers which can form TIPS sheet materials. Blends of the above thermoplastic polymers can also be used. Preferably, TIPS sheet materials useful in the invention comprise polyolefins, more preferably polyethylene and polypropylene, and most preferably, polypropylene Such diffuse reflectivity can also be obtained using a variety of films such as, for example, polyolefin films filled with white particles, blends of incompatible polymers, polyolefin multilayer films; microvoided polyolefin and polyester films; fluorinated polyolefin films; vinyl chloride polymeric films filled with white particles; acrylic films filled with white particles; polyolefin films co-extruded with ethylene-vinyl acetate films; and combinations thereof.

Examples of diffuse reflective film that have produced acceptable results are:

(1) a white TIPS film having an average diffuse reflectivity of approximately 97%, described in the text above and manufactured by 3M Company St. Paul Minn.

(2) a white vinyl film manufactured by 3M Company, St. Paul, Minn. number VS8480 having an average diffuse reflectivity of 94%–95%.

Diffusely Transmissive Sign Faces

Examples of diffusely transmissive sign faces that have produced acceptable results are:

(1) Commercially available PMMA (poly(methyl methacrylate)) sheeting that is loaded with $TiO_2$ and 6.4 mm thick.

(2) A molded PMMA sign face.

(3) Frosted automotive grade laminated glass.

(4) Clear molded PMMA with 3M 3635 film, manufactured by 3M Company, St. Paul, Minn. A white diffuse transmissive film applied to the interior surface.

(5) May also use clear glass with 3M 3635 film applied to the interior surface.

Light Source

The light source or illuminator is a device for illuminating, for example, a 12-mm diameter Light Fiber. It is capable of accepting any MR-16 halogen projector bulb and reflector combination (i.e., lamp) having a definite focal point as a light source, and (when necessary) any 2.4×2.4-inch box fan for forced-convective cooling. The primary intended use is for lamps matched in voltage to that of the available external source of power, and fans matched in both voltage and current type (AC or DC) to that of the external power. Then no additional power-supply components (transformers, voltage regulators, etc.) are required for operation of the illuminator. For example, when 12VDC external power is available, a 12V lamp and a 12VDC box fan should be selected and connected in parallel to one another and then directly to the external power. When several 12V lamps are available, that whose wauage and focal characteristics most nearly match the flux requirements of the fiber application should be selected. When several 12VDC fans are available, that one with an air flow and noise level that most nearly meet the system requirements should be selected. It is clear that by appropriate selection of the lamp and fan the illuminator can serve in a wide variety of fiber applications., The most significant attributes of the illuminator design include its 1) versatility, 2) low cost, 3) control of the exterior housing temperature, and 4) minimization of stray light. Versatility is achieved by utilizing a lamp holder (#H707, Gilway Technical Lamps, Woburn, Mass.) and socket (#H989, Gilway Technical Lamp, Woburn, Mass.) capable of accepting any MR-16 lamp (such as that manufactured by USHIO of Tokyo, Japan). The holder is attached with screws through slots in its base to one of three pairs of threaded holes in the illuminator base plate. The multiple holes along with the play afforded by the slots allow the illuminator to accommodate lamps with focal lengths between 0.5 and 2.5 inches. The contact pins on the lamp are inserted into the socket, the lamp is snapped into the holder, and the leads on the socket are threaded through the hole in the rear center of the base plate. The hole contains a thermally- and electrically-insulating grommet to prevent melting and shorting of the socket leads.

The face plate is attached with screws at a right angle to the front of the base plate. A standard electrical compression fitting (#CGB 195, Cooper Industries, Crouse-Hinds Division, Syracuse, N.Y.) is screwed into a threaded hole in the face plate and used as an inexpensive light fiber chuck (see reference number 70 in FIG. 1). The center of the hole is coilinear with the focal axis of the lamp when the lamp is positioned in the holder on the base plate. The compression fitting accommodates a 0.475-inch ID, 0.600-inch OD clear polycarbonate sleeve approximately four-inches long, cut through lengthwise on one side, and partially through on the diametrically-opposed side (see reference number 72 in FIG. 1). The sleeve is "pried" open, the fiber is inserted into the sleeve, and the sleeve is pressed closed around the fiber. The fiber and sleeve are then inserted into the compression fitting so that the end of the fiber is positioned at the focal point of the lamp. The compression fitting is tightened to hold the fiber and sleeve in place. The sleeve provides a tight fit within the compression fitting and stiffens the fiber so as to hold it parallel to the focal axis of the lamp. A significant cost reduction is realized by using a standard electrical compression fitting to hold the fiber.

The remaining components of the illuminator are constructed by cutting, stamping, and bending sheet metal. This method of construction contributes significantly to cost control.

The bottom housing (with optional feet) is connected with screws to the bottom of the face plate and to the base plate through thermally-insulating offsets. The offsets prevent conduction of heat from the base plate (which is heated by exposure to radiation from the lamp) to the exterior bottom housing, thereby contributing to control of the exterior housing temperature. The leads from the socket pass through a hole in the rear center of the bottom housing. The hole contains an electrically-insulating grommet to prevent chaffing and shorting of the socket leads.

The heat shield is brought down onto the base plate with its front face between the lamp and the end of the fiber, and then slid forward until the tab on the rear contacts the back of the base plate and the fiber extends just inside the hole in the front face of the heat shield. It is held in place by screws anchored in the base plate. The heat shield absorbs the bulk of the stray light from the bulb and converts it to heat. Air flowing across the shield from side to side will remove heat from its exterior surface, and will control the temperature within the shield by flowing through the vents on the sides. Note that the vents are oriented so that the small amount of stray light that escapes the shield will be directed primarily toward the front of the illuminator. The heat shield is critical to controlling the temperature of the exterior top housing when bulbs consuming 150W or more of power are used. Since the shield is intended to absorb light and convert it to heat, it is preferably made of a black metal, such as anodized Aluminum.

The box fan is attached to the exterior of the top housing over the hold on the side of the housing. It is intended to pull air from within the housing over the hold on the side of the housing. It is intended to pull air from within the housing, although pushing air may prove equally effective at cooling. The top housing is then positioned over the illuminator and fastened to the bottom housing with screws. The louvers on the side of the housing are directed with their openings facing the rear of the illuminator. This is important to minimizing stray light—the light exiting the heat shield is directed forward so that very little of it exits the louvers. The leads from the fan and the lamp are connected to the power supply external to the illuminator housing such as, for example, a vehicle's power supply.

Examples of the light source include using MR 16 halogen bulbs rated with a Voltage in the range of 15–24 V, and Wattage in the range 75–150 W, either AC or DC.

EXAMPLE 1

The initial prototype was developed for laboratory measurements to reduce the concept to practice. It was constructed by bending standard aluminum sheet metal into a rectangular box 16"×79"×2". The 5 metal box sides were lined with a pressure sensitive adhesive (psa) backed TIPS film. The sign face was constructed from $TiO_2$ titanium dioxide loaded 6.4 mm PMMA poly(methyl methacrylate) sheet stock with a diffuse reflectivity of approximately 60%. The sign illumination was created using a side extraction light fiber and a remote light source. The fiber consisted of a 12 mm diameter light fiber core manufactured by 3M. A 1 mm wide stripe of $TiO_2$ vinyl film with pressure sensitive adhesive (Scotchcal™ Film, manufactured by 3M company, St. Paul, Minn.) was applied to the length of the fiber to provide side extraction. The fiber was then covered by a heat shrinkable fluoropolymer cladding (made by Zeus Industrial Products Inc., Raritan, N.J.).

The prepared fiber was placed along the entire length of the bottom edge of the sign cavity. The extraction stripe was positioned to direct light upward, across the film lined box surface. A hole was drilled on the side of the box near the lower edge and the fiber extended approximately 25 cm outside of the box. The end of the fiber extending outside of the box was connected to a compact light source containing a 150W Ushio, Japan MR-16 halogen bulb. Fostec model number Fostec ACE TM light engine with a quartz halogen 150 watt MR 16 projector bulb. Fostec light engines manufactured by Fostec Inc., Auburn N.Y. The fiber tip was positioned at the focal point of the halogen bulb to maximize the light entering the fiber. The opposite end of the light fiber was capped with a 12 mm disk of Silverlux™ reflective film produced by 3M.

EXAMPLE 2

The second prototype sign box was made by Elektrovakuum AS, Ostfold, Norway in Norway and shipped to 3M in St. Paul. The sign box was press formed using standard $TiO_2$ PMMA with an average diffuse reflectance of approximately 60%. The box was molded to fit the shape of a Volvo H3 model heavy truck glass sign face. Approximate box interior dimensions were 190 cm×40 cm×4 cm. The pressformed box made by Elektrovakuum was an experimental part, not standard manufacture.

The back and sides of the box interior were lined with TIPS, (the same film described in Example 1). Example 2 was constructed using the same light fiber as used in Example 1. A 2.25 m fiber with vinyl tape white Scotchcal M manufactured by 3M Company, St. Paul Minn. extraction was placed along the lower edge of the back half of the sign box. The extraction stripe was positioned to direct side emitting light upward, across the film lined box surface. A hole was cut on the side of the box near the lower edge and the fiber extended approximately 25 cm outside of the box. The fiber was again illuminated with a MR 16. Halogen bulb.

EXAMPLE 3

Example 3 was constructed using the back half of the sign box described in Example 2. The standard frosted glass of a Volvo H3 model truck sign was used as the sign face and box lid. Again the box was lined with diffuse reflective film. The film used for Example 3 was a $TiO_2$ loaded vinyl film with an average reflectivity of 95%, product number VS8480 produced by 3M.

EXAMPLE 4

A sign cavity was created by laminating 3M VS8480 film to the backside of the truck headliner manufactured by Rieter Society Aubergenville, France, to the exposed edges of the truck sheet metal along the top and bottom of the sign opening and by attaching PMMA panels laminated with 3M VS8480 film to enclose the 2 side edges of the box. A 12 mm light fiber with side extraction was fastened with mechanical clips to the lower edge of the sheet metal with the side extraction direction towards the top of the box. The face of the sign was standard Volvo H3 frosted glass Manufactured by Pilkington Industries, Lancashire, England. Nominal sign thickness 60 mm at top edge, 57 mm at center and 89 mm at bottom edge of the sign face.

EXAMPLE 5

A sheet of 420 denier nylon fabric manufactured by Milliken and Company, LaGrange, Ga. with 3M 8480 film laminated to it was used to generated a sign cavity by fastening it across the sign opening on an H3 Volvo truck cab shell. The corners were mitered and wrapped to create sides panels for the sign cavity. Again 12 mm light fiber with side extraction was fastened to the lower sheet metal edge. Nominal sign cavity thickness ranged from about 75 mm to 100 mm across the sign face.

EXAMPLE 6

3M VS8480 vinyl film was laminated to 0.060" PETG and then attached to the sign opening in an arc shape to create a back panel for the sign cavity. The back panel was attached to the upper and lower edges of the sign opening using plastic window molding track (purchased from Menards) which had been applied to the truck sheet metal using 3M acrylic foam tape. Sign cavity sides were also made from 0.060" PETG poly ethylene terephthalate glycolate laminated with LEF film and cut to fit the curve of the arc. The exposed sheet metal along the upper and lower edges of the sign cavity were also laminated with 3M VS8480 film. Sign cavity thickness was approximately 75 mm at deepest point of the arc and 64 mm at the top edge of the arc.

Notched side extraction light fiber was attached to the lower edge of the sheet metal in the sign cavity with the extraction directed toward the top of the box. Volvo H3 truck frosted glass was used as the sign face. Manufactured by Pilkington Industries, Lacashire, England.

EXAMPLE 7

Same as example 6 except sign face was constructed from a standard sheet of 6.4 mm acrylic sheeting formed and cut to the shape of the glass face. This acrylic panel was then laminated with 3M 3635 white diffuse transmissive film on the interior surface of the sign face. This film may also be applied to the interior surface of clear glass sign faces.

What is claimed is:

1. A vehicle comprising:
   (a) a housing having a sign face and an interior surface that includes a back surface, said sign face having an illuminated area through which light from inside said housing diffusely transmits out of said housing, said interior surface having at least a portion thereof that is diffuse reflective enough to provide luminance uniformity to said sign, said back surface being located at a depth from said sign face, and said illuminated area being large relative to said depth;
   (b) a light source for supplying light to a light fiber; and
   (c) at least one side-light emitting fiber connected so as to receive light from said light source and mounted within said housing so as to significantly limit the amount of emitted light, from said at least one side-light emitting fiber, that travels directly to said sign face wherein the vehicle is a truck and said truck has a cab with an exterior surface and an interior cabin space, and said sign has a depth and is mounted in said cab such that said sign face is about flush with said exterior surface and said housing extends very little, if any, into said interior cabin space.

2. A vehicle comprising:
   (a) a housing having a sign face and an interior surface that includes a back surface, said sign face having an illuminated area through which light from inside said housing diffusely transmits out of said housing, said interior surface having at least a portion thereof that is diffuse reflective enough to provide luminance uniformity to said sign, said back surface being located at a depth from said sign face, and said illuminated area being large relative to said depth;
   (b) a light source for supplying light to a light fiber; and (c) at least one side-light emitting fiber connected so as to receive light from said light source and mounted within said housing so as to significantly limit the amount of emitted light, from said at least one side-light emitting fiber, that travels directly to said sign face wherein the vehicle is a truck having a cabin with an interior cabin space and the interior cabin space is at least partially defined by a headliner, and said housing is dimensioned to fit between the exterior of said truck cab and said headliner.

3. An unassembled shallow back lit illuminated sign comprising:
 (a) a sign face panel, having an illuminated area that diffusely transmits light, and at least one interior surface panel which can be assembled to form a housing and, when assembled to form the housing,
   (i) said at least one interior surface panel forms an interior surface of the housing including a back surface,
   (ii) said interior surface has at least a portion thereof that is diffuse reflective enough to provide luminance uniformity to the assembled sign,
   (iii) said back surface is located at a depth from said sign face, and
   (iv) said illuminated area is large relative to said depth;
 a light source for supplying light to a light fiber; and
 (c) a side-light emitting fiber connectable so as to receive light from said light source and mountable within the assembled housing so as to significantly limit the amount of emitted light, from said fiber, that travels directly to said sign face wherein the diffuse reflectivity of said interior surface is provided by at least one diffuse reflective film either pre-attached to or separate from but attachable to said at least one interior surface panel and said at least one interior surface panel is a plurality of interior surface panels and the diffuse reflectivity of said interior surface is provided by a plurality of diffuse reflective films, with each said film being either pre-attached to or separate from but attachable to at least one of said interior surface panels.

4. An unassembled shallow back lit illuminated sign comprising:
 (a) a sign face panel, having an illuminated area that diffusely transmits light, and at least one interior surface panel which can be assembled to form a housing and, when assembled to form the housing
   (i) said at least one interior surface panel forms an interior surface of the housing including a back surface,
   (ii) said interior surface has at least a portion thereof that is diffuse reflective enough to provide luminance uniformity to the assembled sign,
   (iii) said back surface is located at a depth from said sign face, and
   (iv) said illuminated area is large relative to said depth;
 (b) a light source for supplying light to a light fiber, and
 a side-light emitting fiber connectable so as to receive light from said light source and mountable within the assembled housing so as to significantly limit the amount of emitted light, from said fiber, that travels directly to said sign face wherein the diffuse reflectivity of said interior surface is provided by at least one diffuse reflective film either pre-attached to or separate from but attachable to said at least one interior surface panel and said at least one interior surface panel is a plurality of interior surface panels and the back surface is formed by at least two interior surface panels.

* * * * *

UNITED STATES PATENT AND TRADEMARK OFFICE
CERTIFICATE OF CORRECTION

PATENT NO.   : 6,821,007 B1
DATED        : November 23, 2004
INVENTOR(S)  : Olman, Cheryl A.

It is certified that error appears in the above-identified patent and that said Letters Patent is hereby corrected as shown below:

Column 1,
Line 48, delete "bad" and insert -- had --, therefor.

Column 6,
Line 59, delete "Ltu" and insert -- Ltd. --, therefor.

Column 7,
Line 5, after "i.e." insert -- , --.

Column 9,
Line 14, delete "wauage" and insert -- wattage --, therefor.
Line 21, delete "," after "applications.".
Line 46, delete "coilinear" and insert -- collinear --, therefor.

Column 11,
Line 26, delete "Scotchcal M" and insert -- Scotchcal$^{TM}$ --, therefor.

Column 12,
Line 24, delete "Lacashire" and insert -- Lancashire --, therefor.

Column 13,
Line 26, insert -- (b) -- before "a light".

Column 14,
Line 12, after "housing" insert -- , --.
Line 22, after "fiber" delete "," and insert -- ; --, therefor.
Line 23, insert -- (c) -- before "a side-light".

Signed and Sealed this

Eighteenth Day of October, 2005

JON W. DUDAS
*Director of the United States Patent and Trademark Office*